(12) United States Patent  
Hiltunen

(10) Patent No.: US 7,187,664 B2  
(45) Date of Patent: Mar. 6, 2007

(54) METHOD AND ARRANGEMENT IN A COMMUNICATION SYSTEM

(75) Inventor: Kimmo Hiltunen, Espoo (FI)

(73) Assignee: Telefonaktiebolaget L.M. Ericsson, Stockholm (SE)

(*) Notice: Subject to any disclaimer, the term of this patent is extended or adjusted under 35 U.S.C. 154(b) by 1105 days.

(21) Appl. No.: 10/157,221

(22) Filed: May 29, 2002

(65) Prior Publication Data

US 2003/0086398 A1 May 8, 2003

(30) Foreign Application Priority Data

Nov. 6, 2001 (SE) .................................. 0103683

(51) Int. Cl.
*H04Q 7/00* (2006.01)
(52) U.S. Cl. ...................................... 370/318; 370/328
(58) Field of Classification Search ................... None
See application file for complete search history.

(56) References Cited

U.S. PATENT DOCUMENTS

| 5,722,061 | A | | 2/1998 | Hutchison, IV et al. | |
|---|---|---|---|---|---|
| 5,930,692 | A | * | 7/1999 | Peterzell et al. | 455/217 |
| 6,101,179 | A | * | 8/2000 | Soliman | 370/342 |
| 6,141,565 | A | * | 10/2000 | Feuerstein et al. | 455/560 |
| 6,356,745 | B1 | * | 3/2002 | Lee et al. | 455/232.1 |
| 6,377,555 | B1 | * | 4/2002 | Lee et al. | 370/252 |
| 6,426,971 | B1 | * | 7/2002 | Wu et al. | 375/227 |
| 6,473,451 | B1 | * | 10/2002 | Seki et al. | 370/335 |
| 6,498,927 | B2 | * | 12/2002 | Kang et al. | 455/245.2 |
| 6,975,671 | B2 | * | 12/2005 | Sindhushayana et al. | 370/342 |
| 2002/0025778 | A1 | * | 2/2002 | Lee | 455/3.05 |
| 2003/0058821 | A1 | * | 3/2003 | Lee et al. | 370/335 |

FOREIGN PATENT DOCUMENTS

| EP | 1 063 788 A1 | 12/2000 |
|---|---|---|
| WO | WO 01/37446 | 5/2001 |
| WO | WO 01/47147 | 6/2001 |
| WO | WO 01/67634 | 9/2001 |

* cited by examiner

*Primary Examiner*—Chi Pham  
*Assistant Examiner*—Anh-Vu Ly  
(74) *Attorney, Agent, or Firm*—Myers Bigel Sibley & Sajovec

(57) ABSTRACT

The invention relates to a method and an Automatic Gain Control (AGC) unit for automatically minimizing the impact of inter-cell interference and/or interference between co-existing systems. The AGC unit is located within a transceiver unit, the transceiver unit is located in a radio base station in a Code Division Multiple Access (CDMA) telecommunication system and the AGC unit is connected to a High Power Amplifier SPA) unit adapted to transmit radio signals to a mobile terminal and to a Low Noise Amplifier (LNA) unit adapted to receive radio signals from a mobile terminal, the High Power Amplifier (HPA) unit comprises means for automatically adoption of a maximum output power level adapted to the current inter-cell interference and/or interference between co-existing systems wherein the AGC unit comprises means for controlling the output power levels of the output signals of the HPA unit by an AGC unit by using estimated interference related parameters.

32 Claims, 12 Drawing Sheets

METHOD AND ARRANGEMENT IN A COMMUNICATION SYSTEM

RELATED APPLICATIONS

This application claims the benefit of Swedish Patent Application No. 0103683-9, filed Nov. 6, 2001, the disclosure of which is hereby incorporated herein in its entirety as if set forth fully herein.

FIELD OF INVENTION

The present invention relates to a Code Division Multiple Access (CDMA) cellular telecommunication system according to the preamble of the independent claim.

In particular, the invention relates to a method and an arrangement for minimizing the impact of interference between co-existing systems by means of an adaptive algorithm that both controls either a transmitter gain or a receiver sensitivity, or both the transmitter gain and the receiver sensitivity at a radio base station.

BACKGROUND OF THE INVENTION

One of the basic principles when deploying a cellular telecommunication system is the re-use of frequencies in order to increase the served area capacity. However, re-using the same frequencies in other cells of the system, introduces co-channel interference that results in capacity and coverage losses in the system. In a CDMA system, the same frequency is typically used in all cells. Hence, other means have to be applied in order to control the co-channel interference. Therefore, special channelisation codes are used to separate signals for different users, and to suppress the co-channel interference.

On the other hand, when a radio system is co-existing with a radio system operating on another carrier frequency, it will experience some amount of adjacent channel interference due to imperfections in receivers and transmitters. This additional interference will then result in capacity and/or coverage losses unless some kind of a countermeasure is applied.

A traditional way to combat the impact of any additional interference and to maintain a certain Signal-to-Noise Ratio (SNR) is to increase the transmitted signal power. This can be understood by e.g. looking at the equation for the SNR of a Wideband CDMA (WCDMA) downlink (i.e. the direction from the radio base station to the mobile terminal) traffic channel between user i and radio access port n. A radio access port within a radio base station may comprise a baseband part 102, a modem 104 and a transceiver 106 The radio access port may also e.g. comprise other parts or a plurality of transceivers. However, in this invention the radio access part comprises at least one transceiver. Thus, $$SNR_{i,n} = \frac{W}{R_i} \cdot \frac{P_{i,n}}{L_{i,n}\left(\left(\sum_{b=1}^{B} \frac{P_{tot,b}}{L_{i,b}}\right) - (1-\alpha_i)\frac{P_{tot,n}}{L_{i,n}} + I_{ext,i} + N_i\right)}$$

where

W is the chip rate [s$^{-1}$]
R$_i$ is the data rate for the traffic channel [bit/s]
P$_{i,n}$ is the transmitted power for the traffic channel [W]
L$_{i,n}$ is the path loss between user i and radio access port n
B is the number of radio access ports in the system
P$_{tot,b}$ is the total output power for radio access port b [W]
α$_i$ is the downlink orthogonality factor for user i
I$_{ext,i}$ is the received external interference for user i [W]
N$_i$ is the receiver noise floor [W]

Thus, it can be stated that the required total transmitted signal power required to serve a certain amount of users depends among other things on the level of the inter-cell and inter-system interference.

On the downlink in a WCDMA system, a number of physical common channels are used to transmit control information, e.g. the pilot channel, the broadcast channel, the synchronization channel and the paging channel, over the whole cell area. The SNR experienced by user i for one such common control channel can be calculated as $$SNR_{CCH,i,n} = \frac{W}{R_{CCH}} \cdot \frac{P_{CCH,n}}{L_{i,n}\left(\left(\sum_{b=1}^{B} \frac{P_{tot,b}}{L_{i,b}}\right) - (1-\alpha_i)\frac{P_{tot,n}}{L_{i,n}} + I_{ext,i} + N_i\right)}$$

where

W is the chip rate [s$^{-1}$]
R$_{CCH}$ is the data rate for the common channel [bit/s]
P$_{CCH,n}$ is the transmit power for the common channel [W]
L$_{i,n}$ is the path loss between user i and radio access port n
B is the number of radio access ports in the system
P$_{tot,b}$ is the total output power for radio access port b [W]
α$_i$ is the downlink orthogonality factor for user i
I$_{ext,i}$ is the received external interference for user i [W]
N$_i$ is the receiver noise floor [W]

Now, in order to have an acceptable quality of the common channels over the whole cell area, the power of the common channels P$_{CCH}$ has to be tuned so that an acceptable percentile of users, i.e. between user i and radio access port n, have an SNR equal or greater than a minimum required SNR, i.e.

$$SNR_{i,n} \geq SNR_{minreq}$$

assuming certain total power P$_{tot}$ levels over the whole system. Thus, the required power of the common channel P$_{CCH}$ will be a function of the co-channel and adjacent channel interference.

Taking all the above facts into consideration, the total required output power of the radio access port depends among other things on the level of co-channel and adjacent channel interference experienced by the users connected to the radio access port in question.

In WCDMA, the handover between different radio base stations is based on measurements on the downlink Common Pilot CHannel (CPICH). A mobile terminal is defined to be at the cell border between a first cell, and a second cell, when the received CPICH downlink power is equal from a first radio access port and a second radio access port, wherein said first radio access port is located within the first cell and said second radio access port is located within the second cell. In order to balance the uplink (i.e. in the direction from the mobile terminal to the base station), the receiver sensitivity can be reduced at the radio access port with the lowest CPICH transmit power. By doing so, the received SNR can be made equal at both radio access ports. This kind of action is often referred to as desensitisation.

Usually, when a radio access port is desensitised, the receiver noise floor ($N_n$) is artificially raised. The required received carrier power ($C_{i,n}$) is then increased. This can be understood by solving the received carrier power from the uplink SNR equation. Thus, the required received carrier power ($C_{i,n}$) is $$C_{i,n} = \frac{1}{1 + \frac{W}{SNR_{i,n} \cdot R_i}} \cdot (I_{tot,n} + N_n)$$

where $$I_{tot,n} = I_{intra,n} + I_{inter,n} + I_{ext,n}$$

The desensitisation can be used to balance the required uplink power at the cell border, but it has also another positive effect; it offers additional protection towards any external interference. However, it has also a few negative effects, e.g. due to the worse receiver sensitivity, the transmission power of the mobile terminals is increased, and therefore the interference towards other systems and/or cells is increased. In addition, the uplink coverage area is degraded. Therefore, it should be carefully considered when, and which amount of desensitisation should be used in each case. The architecture of a traditional radio access port 100, according to the state-of-the-art, can be illustrated as in FIG. 1a. Thus, the transmitter (Tx) and receiver (Rx) chain consist of a baseband part 102, a modem 104 and a transceiver 106. The baseband part handles data coding/decoding, encryption/removing of encryption, channel coding/decoding and interleaving/deinterleaving and the modem handles modulation (at Tx), demodulation (at Rx), channel equalizer (at Rx) and detection. In particular, the transceiver part 106 includes a High Power Amplifier (HPA) 110 for the Tx and Low Noise Amplifier (LNA) 108 for the Rx.

Typically, the maximum output power can be adjusted e.g. by adjusting the level of the input signal to the HPA. In a similar way, the receiver sensitivity can be adjusted by changing the grade of amplification in the LNA. In prior art, these two adjustments are not performed dynamically. Thus, when deploying the radio system, the levels are adjusted so that they fit to the current radio environment, but if the radio environment changes, the levels are not changed automatically.

As an example, a simple co-existence scenario between an outdoor and an indoor WCDMA system can be considered, see FIG. 2. There, each floor 202 is covered by one cell 204 consisting of one or more radio access ports 206. It is obvious, that the external interference ($I_{ext}$) (or internal interference ($I_{inter}$) depending on the frequency allocation) originates from an outdoor WCDMA system is the largest on the top floors, while it has only a minor impact on the lower floors. Therefore, in order to guarantee a certain capacity throughout the building, and as low interference towards the other cells and/or systems as possible, the radio access ports 206 have to be tuned separately for each floor. Furthermore, since the interference from the outdoor base station 208, covering an outdoor cell 212, can be a major part of the total downlink interference on the top floors, the indoor capacity on those floors has a relatively strong dependency on the outdoor cell 212 loading situation.

If the uplink is considered, a great majority of the indoor-to-outdoor uplink interference is generated by the users located on the top floors. Furthermore, the outdoor-to-indoor uplink interference has the largest impact on lower floors. Therefore, the radio access port 206 sensitivity should preferably be better on higher floors compared to the lower floors. Good sensitivity results in low average transmit power for the mobile terminals 210, but a low level of protection against external uplink interference.

A disadvantage with the above-described approach is that the maximum output power level of the radio access port and the receiver sensitivity have to be manually adjusted separately for each cell in order to tune the system performance. Furthermore, the solution above may work well during some e.g. average time periods, but it does not adapt to the changes in the neighbourhood. Thus, during some e.g. heavy traffic periods, the offered capacity might be limited under the planned or required capacity, while during other e.g. light traffic periods, the transmit power levels might be greatly over-allocated, resulting in unnecessary high power consumption within the own system and interference towards other systems.

In WO01/37446 an adaptive algorithm is shown. The algorithm controls the base station transmitter gain and the base station receiver attenuation in a CDMA system in order to balance the load between the cells and thus maximize the capacity of the system. The main input to the adaptive algorithm consists of the estimated uplink noise rise (total uplink interference over the thermal noise), the so-called "F factor". The F factor is defined as the uplink intracell interference divided by the total uplink interference (intracell interference plus intercell interference).

A method for minimizing the effect of interference in a radio system is disclosed in WO01/67634. The base station comprises means for adaptive attenuating the signal received from the mobile terminal. The goal is to maximize the attenuation, i.e. the base station should be as insensitive as possible. Power control requests or measured signal interference at the reception frequency band are used as input for the adaptive attenuation. The attenuation algorithm can also be affected if a single user experiences a too low Grade of Service. WO01/67634 discloses the features of the preamble of claim 1.

A disadvantage with WO01/67634 is that it does not control the downlink BS transmitter gain. Another disadvantage is that the BS receiver is attenuated as much as possible which results in that the mobile terminal is required to transmit with a high power level. High power transmitting terminals results further in high battery consumption which may be a problem.

Thus, the object of the present invention is to provide a method that automatic and adaptive controls the downlink transmitter gain of the base station and the uplink receiver sensitivity of the base station adaptively on a long term basis in order to minimize the impact of interference between co-existing systems.

SUMMARY

The above-mentioned object is achieved by a method and an Automatic Gain Control (AGC) unit set forth in the characterizing part of the independent claims.

Preferred embodiments are set forth in the depending claims.

An advantage with the present invention is that the system capacity and coverage can be better maintained throughout the system, even if the interference situation is changing.

Another advantage with the present invention is that the control of the interference towards other cells/systems is enhanced.

A further advantage with the present invention is that it is not necessary to perform manual tuning of the transmitter gain and receiver sensitivity after installation of a system.

DETAILED DESCRIPTION OF PREFERRED EMBODIMENTS

The solution to the problem described above is, according to the present invention, to modify the transceiver unit of the radio access port, located in a radio base station, in order to facilitate automatic tuning of the maximum output power of the transceiver and the sensitivity of the receiver in order to minimize the impact of inter-cell interference and/or interference between co-existing radio systems.

Figure 1A:
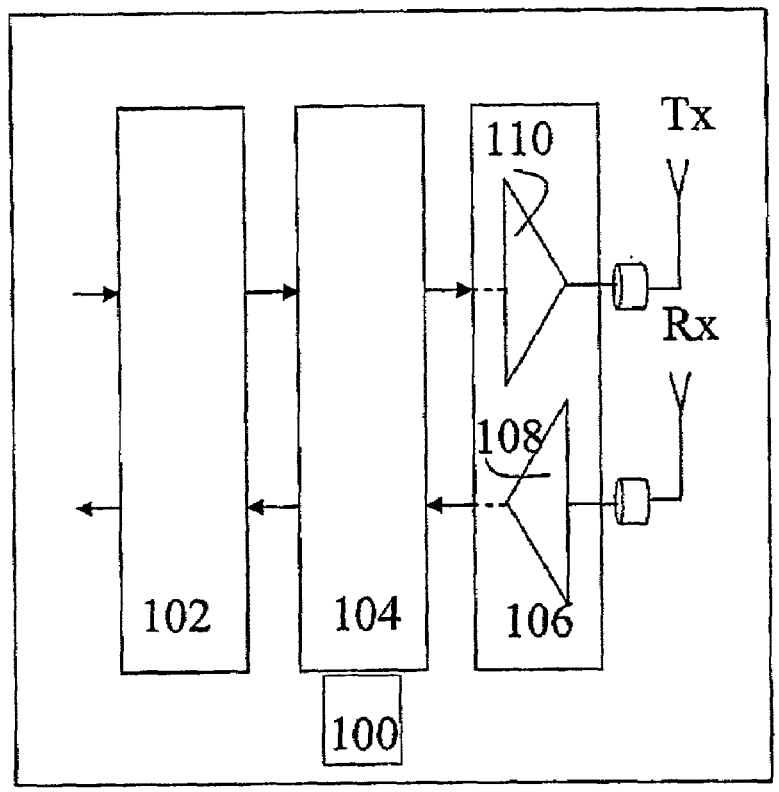
FIG. 1a shows a block-diagram of a radio access port according to prior art.
Figure 1B:
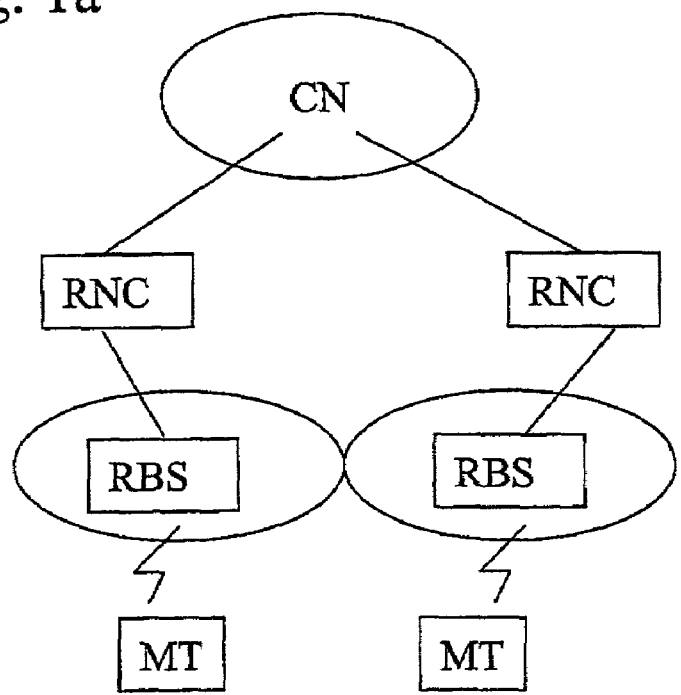
FIG. 1b shows an exemplary telecommunication network.
Figure 2:
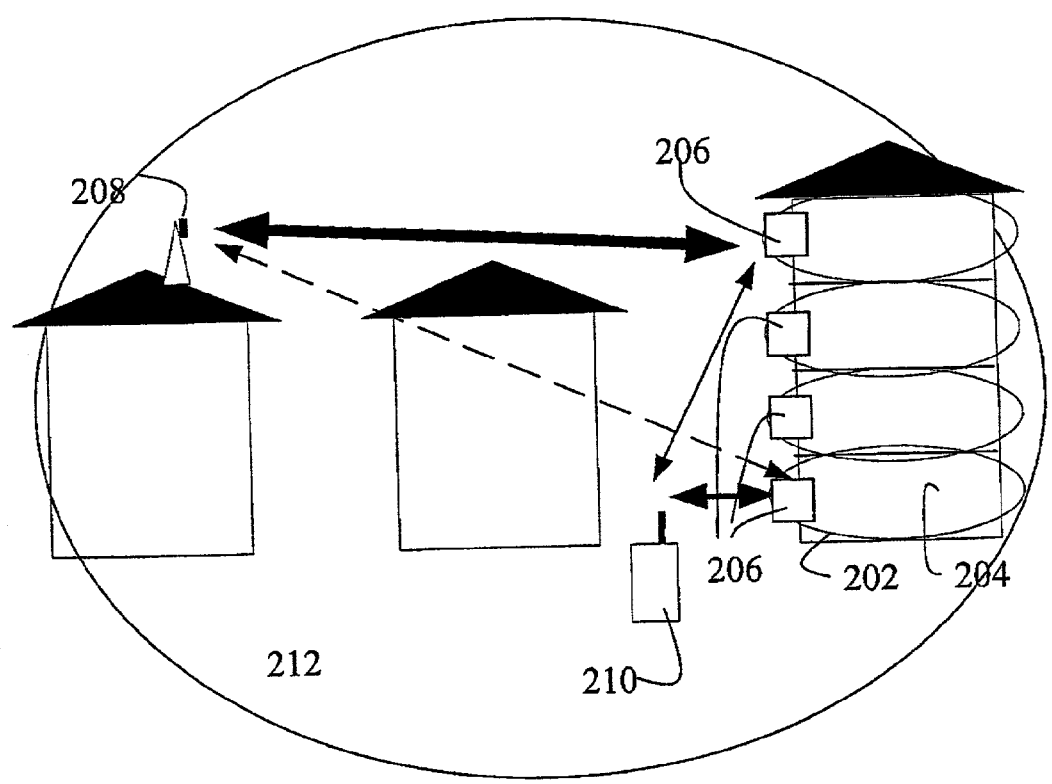
FIG. 2 shows an example of a scenario when a WCDMA indoor system co-exists with an outdoor WCDMA system.

FIG. 1b shows an exemplary telecommunication network wherein the radio access port according to the present invention may be implemented. The radio access port is located within a radio base station. Each radio base station is connected to a Radio Network Controller (RNC) that is further connected to a Core Network. The Core Network is common for the entire network and is further connected to other networks, e.g. PSTN (Public Switched Telephone Network) and the Internet. The mobile terminals communicate with the telecommunication network via at least one radio base station. The RNC controls the radio base stations that are connected to it.

Figure 3:
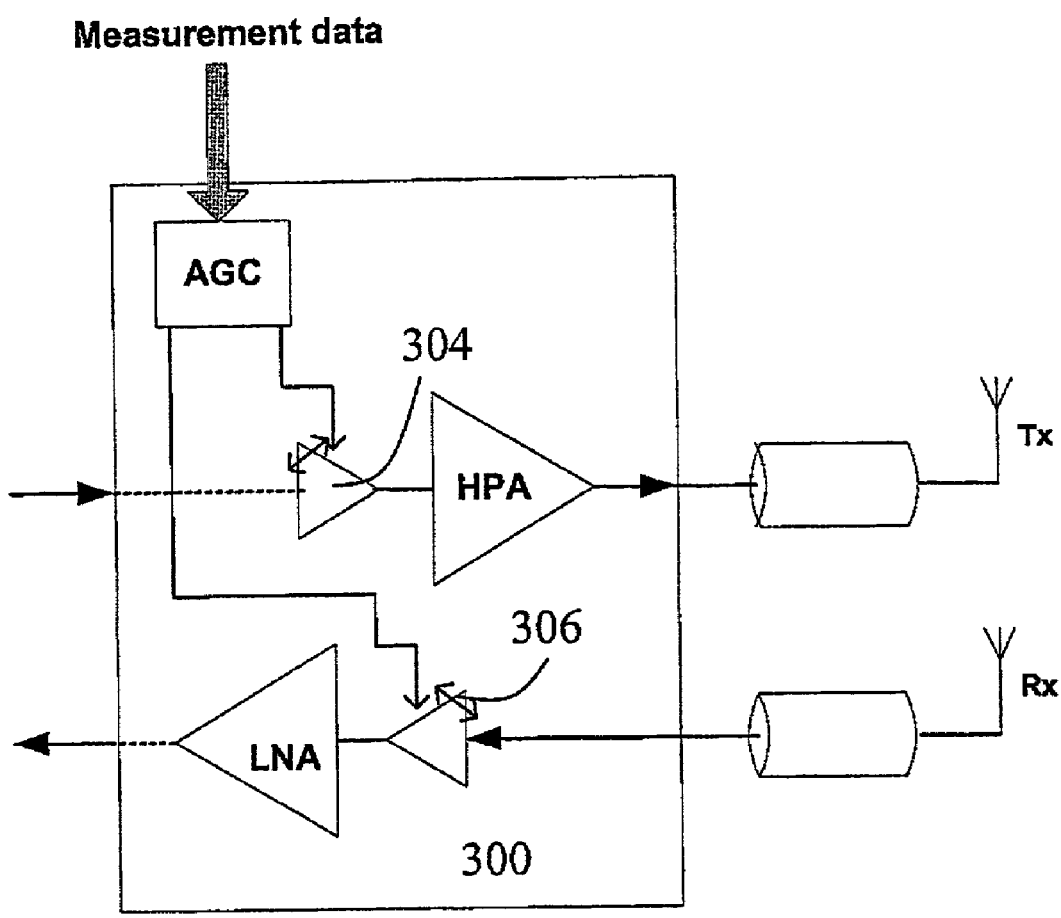
FIG. 3 shows the transceiver unit according to the present invention.

The modified transceiver 300 according to the present invention is shown in FIG. 3. A transceiver unit 300 is connected to a transmitting antenna (Tx) and a receiving antenna (Rx) respectively. The transceiver unit comprises a HPA unit for the transmitting signals, a LNA unit for the receiving signals and an Automatic Gain Control (AGC) unit. The AGC unit is connected to the HPA unit and LNA unit respectively via adaptive attenuators 304, 306 that respectively are controlled by the AGC unit. The levels of the input signals to the HPA unit and LNA unit are automatically controlled based on the instructions from the AGC function, which uses measurement data as input. In this example, the adaptive gain in the HPA unit and LNA unit is obtained with an adaptive attenuator 304,306 controlled by the AGC unit located in front of a fixed gain HPA unit (or fixed gain LNA unit) but it could also be obtained in another way, e.g. with variable gain HPA and LNA units controlled by the AGC. Thus, the AGC unit is controlling the adaptive gain of an HPA unit and an LNA unit. For Radio Resource Management (RRM) reasons it might be advantageous to control several radio access ports, e.g. the ones belonging to a certain group (e.g. that controls a certain area), in a similar manner, i.e. under a centralized control. At handover, the centralized control may be used for admission control and congestion control. Furthermore, since typically in the (W)CDMA systems the borders between the neighbouring cells are defined by the received Common Pilot Channel (CPICH) power levels, a centralized control of the transmitted CPICH can be advantageous. Sometimes, it is required that several neighbouring cells are controlled by the centralized control, and other times they need to be controlled independently of each other. Therefore, all the related AGC functions could be co-located, e.g. in a Radio Network Controller (RNC), or the "logical" AGC functions can be assumed to be able to exchange information with each other. Here there are at least three possibilities:

Logically there is one AGC unit, but the physical location of the function can differ. It can be located within the radio access port (distributed) in which case the AGC units have to be able to exchange information between the different radio access ports.

It can also be located within the RNC (centralized) together with the other logical AGC units (but probably just within one function which controls a group of radio access ports). Since in this case the logical AGC units are located in the same node, and probably within the same function, the exchange of information will not cause any problems.

Finally, it is supposed that the AGC unit could also be splitted between the RNC and the radio access port. Thus, some parts of it are located centralized, and some parts are located locally at radio access ports. Each radio access port includes a full AGC functionality, but some parts of it could be overruled by the central AGC unit.

The last one will offer an increased flexibility, since in such a case it is easy to redefine which cells are controlled in a centralized manner and which are not.

Said input measurement data, to the AGC unit, comprises of:

Estimated total output power of the radio access port (e.g. a ratio $P_{tot}/P_{max}$)

Uplink quality statistics (e.g. statistics from received events where a fraction of mobiles transmitting close to the maximum power, uplink BLER, i.e. Block Error Rate, statistics over the connected services).

Downlink quality statistics (e.g. estimated relative powers, $P_{DPCH}/P_{max}$ (where DPCH is the Downlink Physical Channel) for the radio links connected to the radio access port, statistics over retransmission requests)

Estimated load level (e.g. the number of users, number of radio links, cell throughput taking the required bit rates and signal-to-noise ratios into account)

Measured total wide band interference ($I_{tot}$) on the Tx carrier frequency (optional).

Other, pre-defined input is:

Target value for the cell load level, $\eta_{target}$. Possibly a separate value for the uplink and the downlink.

Minimum quality requirement for different services.

Minimum allowed Grade of Service (GoS) level for the cell

The object of the present invention is achieved, independently whether measurements of the total interference ($I_{tot}$) are available, or not. However, the best mode of the present invention is carried out when measurements of the total interference ($I_{tot}$) are available and when both the transmitter gain and the receiver sensitivity are automatically controlled.

The Total Interference ($I_{tot}$) Measurements are Available

Figure 4:
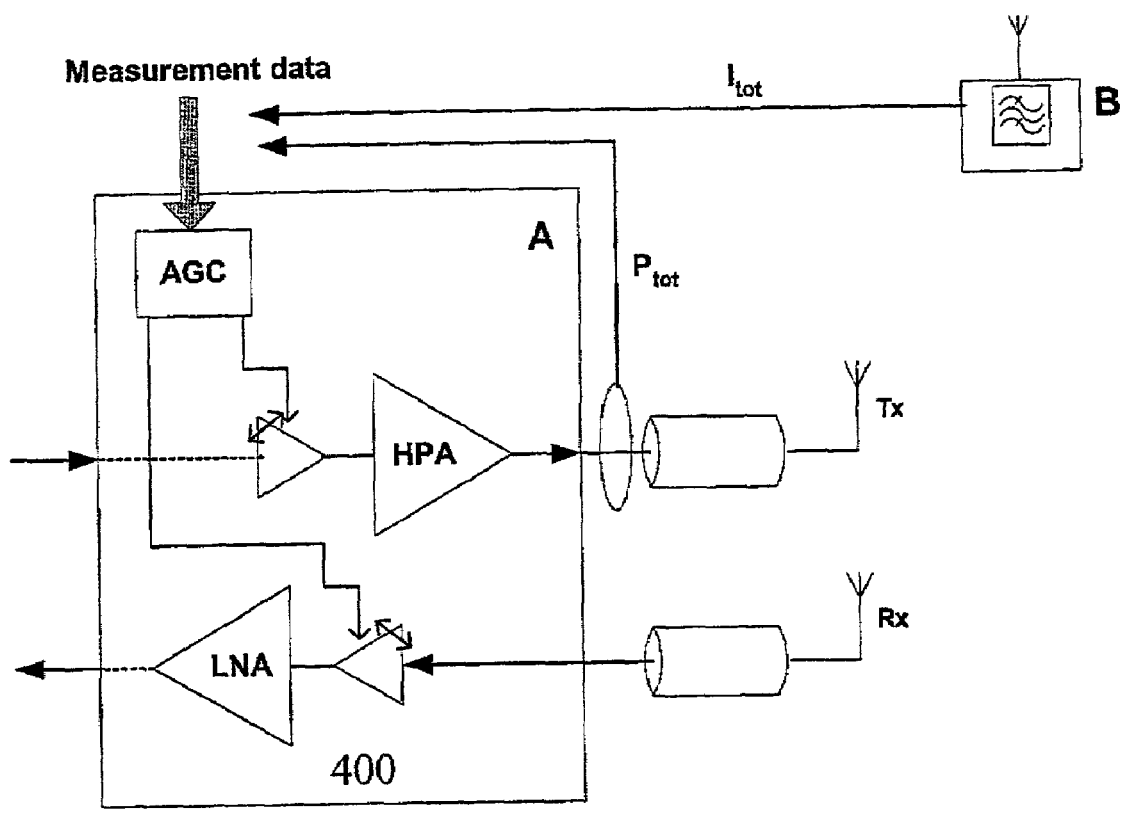
FIG. 4 shows the transceiver unit according to the present invention when measurements of the total interference are available.

If the $I_{tot}$ measurement samples are available, the gain in the HPA unit and the receiver sensitivity in the LNA unit are adjusted as a function of the estimated external interference level $I_{ext}$. The modified transceiver that is used for performing this method is illustrated by FIG. 4.

The total interference level $I_{tot}$ can be estimated e.g. with special measurement nodes (B) located either close to each of the radio access ports, or centralised, so that one measurement node covers more than one radio access port.

Figure 5:
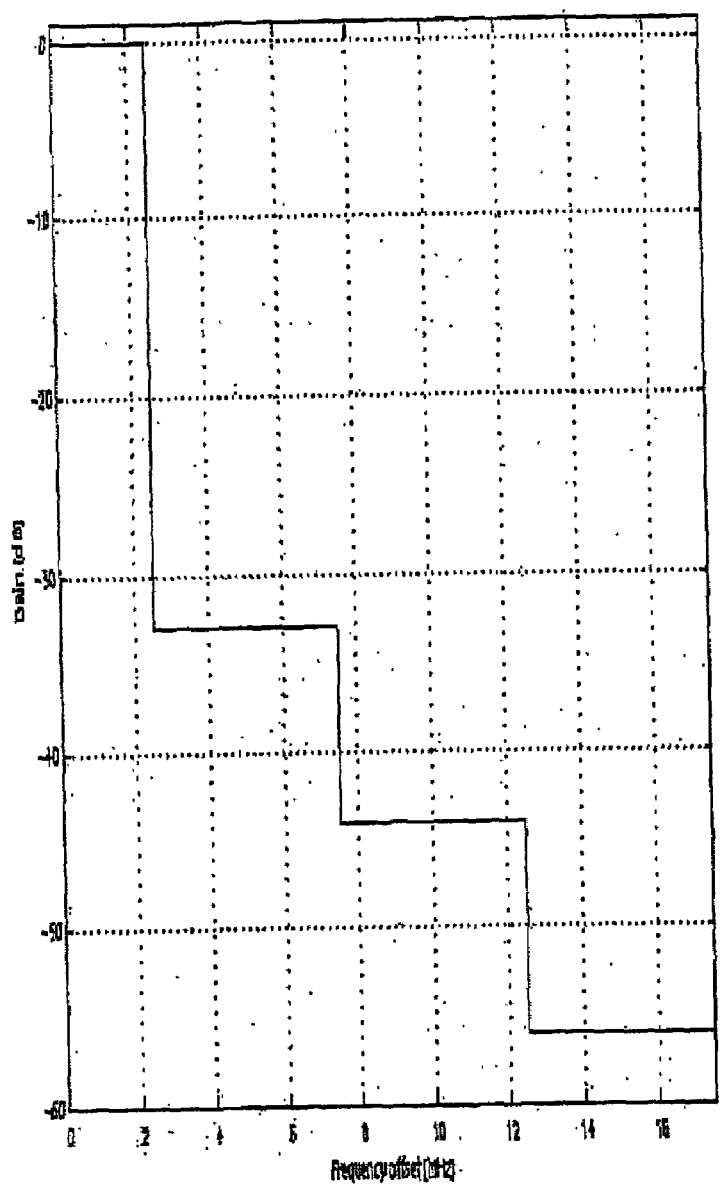
FIG. 5 shows an example of a suitable normalized energy response for the measurement filter.

It should be noted, that in order to be able to estimate the impact of interference from adjacent frequency carriers, the $I_{tot}$ should be measured with a filter that emulates, at least to some extent, the adjacent channel selectivity performance of the typical mobile terminal connected to the system. In FIG. 5, a normalised energy response of a suitable filter in a Wideband CDMA (WCDMA) system is shown.

From the measurement node, the $I_{tot}$ samples are transmitted to the AGC function. There, the corresponding $I_{ext}$ values are calculated by substracting the impact of the own cell power from the measured $I_{tot}$. Thus, $$I_{ext} = I_{tot} - \frac{P_{tot}}{L}$$

where L is the estimated path loss from the reference point where the total output power of the radio access port $P_{tot}$ is estimated towards the reference point where $I_{tot}$ is measured. The estimated L can be adaptively calibrated based on test measurements during low traffic periods (i.e. when $I_{ext} \approx 0$). Finally, since this kind of tuning of a mobile system can typically be a relatively long term activity, the $I_{tot}$ measurements can be relatively infrequent.

Based on the estimated $I_{ext}$, the AGC unit tunes the input level to HPA unit and LNA unit at radio access port A. If the estimated $I_{ext}$ is low, a low level of downlink control and traffic channel power is needed to offer a certain coverage and capacity. For the uplink, a poorer sensitivity can be allowed i.e. lower gain in LNA unit. A poor sensitivity has at least two positive consequences for this scenario. Firstly, a low $I_{ext}$ suggests that there are no adjacent channel radio ports in the neighbourhood. Therefore, a mobile terminal located close to the measurement point, but connected to the adjacent channel radio access port would need a relatively high transmit power. Thus, at the same time, it could have quite strong impact on the uplink at the radio access port A. Now, if the receiver sensitivity at radio access port A is poor, the impact of external interference can be decreased. Secondly, the reduced uplink sensitivity helps to maintain the balance between the uplink and the downlink coverage. As mentioned earlier, the disadvantage with the uplink desensitisation is that the average transmit power of the mobiles connected to the radio access port is increased, which results in increased interference towards other cells/systems. But, since In is low, also the impact towards other systems could be assumed to be low.

On the other hand, if the estimated $I_{ext}$ is high, a higher level of downlink control and traffic channel power is needed to offer a certain coverage and capacity. Now, the AGC unit increases the input level to the HPA. At the same time, the input level to LNA unit is increased. The reason for this is to improve the uplink sensitivity and as a result of that to minimize the interference towards the other system.

Figure 6:
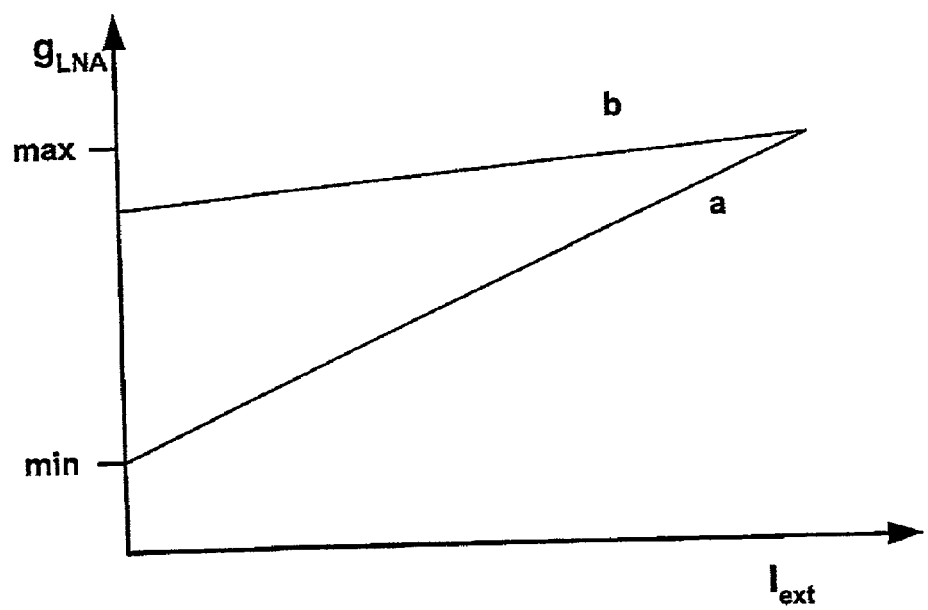
FIG. 6 shows the gain of the LNA unit ($g_{LNA}$) as a function of the external interference, $I_{ext}$.
Figure 7:
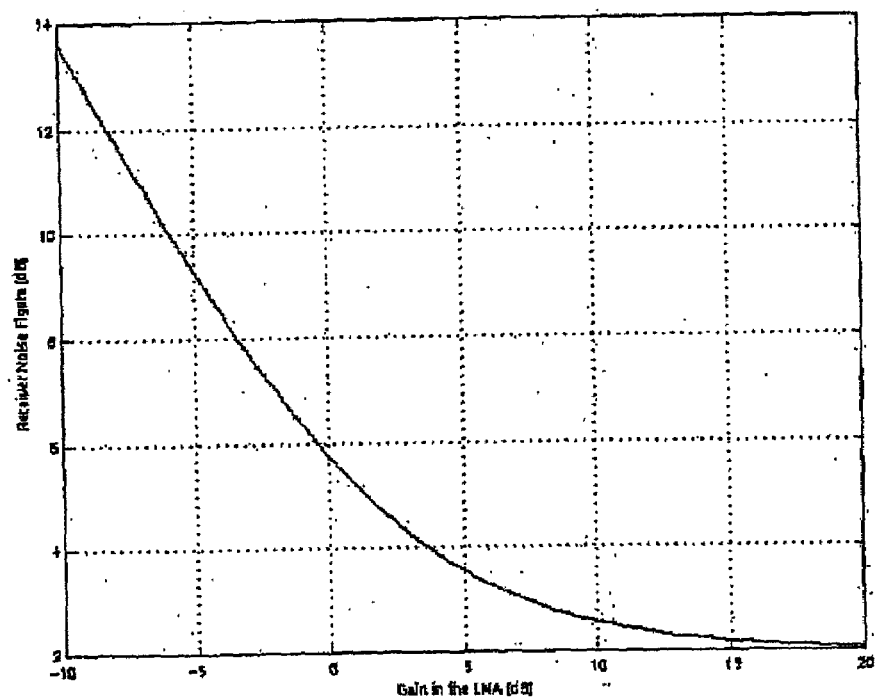
FIG. 7 shows the receiver noise figure as a function of the $g_{LNA}$.

In FIG. 6, the curve a refers to a traditional co-existence scenario, where a high $I_{ext}$ measured close to the radio access port has a relatively high impact on the required $g_{LNA}$. This can be the case e.g. on the top floor of a building, where a large portion of the total downlink interference can come from surrounding macro base stations. Curve b, on the other hand, describes a scenario where e.g. an adjacent channel WCDMA base station is located relatively close to the radio access port, e.g. when two antennas belonging to different operators are located in the same tower, or close to each other. In such a scenario, even though the measured $I_{ext}$ level is high, the external uplink interference has only a minor impact on the required $g_{LNA}$. The radio access port may also be considered to cover large cells. Thus, the uplink sensitivity has to be relatively good (i.e. large $g_{LNA}$ required). The minimum allowed level for the $g_{LNA}$ is dependent on the coverage and capacity requirement. In small cells, the coverage and capacity requirement could perhaps allow an unnecessary small $g_{LNA}$. Thus, in small cells the minimum level should preferably be set based on the required protection, or uplink balancing level. The maximum allowed level for the $g_{LNA}$ can be justified by looking at the resulting receiver noise figure (NF) as a function of the $g_{LNA}$. Assuming that the LNA unit is located close to the Rx antenna, the resulting noise figure can be calculated as $$NF = 10 \cdot \log_{10}\left(NF_{LNA} + \frac{(NF_{cable} - 1)}{g_{LNA}} + \frac{(NF_{BTS} - 1)}{g_{LNA} g_{cable}}\right)$$

where $NF_{LNA}$ is the noise figure for the LNA, $NF_{cable}$ is the noise figure for the cable between the LNA unit and the rest of the radio access port, $NF_{BTS}$ is the noise figure for the radio access port, and $g_{cable}$ is the gain value for the cable. Assuming that $NF_{LNA}=1.6$ (2 dB), $NF_{cable}=1.6$ (2 dB), $NF_{BTS}=2.0$ (3 dB) and $g_{cable}=0.6$ (−2 dB), the curve in FIG. 7 can be obtained. As it can be seen, with the assumptions listed above, $g_{LNA}$ larger than 10–15 dB will not result in any remarkably improvement of the receiver sensitivity.

Figure 8:
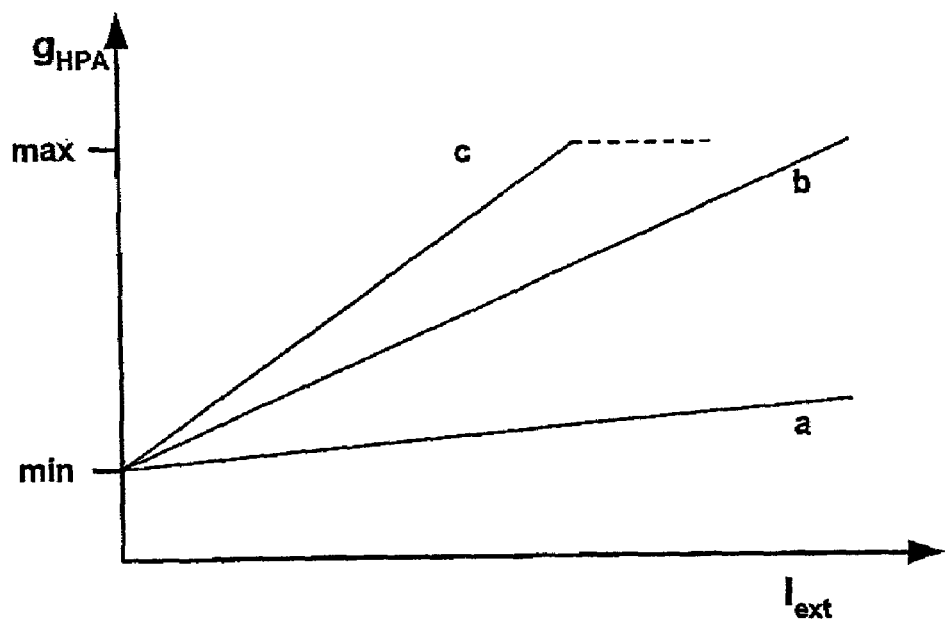
FIG. 8 shows the gain of the HPA unit as a function of $I_{ext}$.

In FIG. 8, the curve a corresponds to a co-siting, or close to a co-siting scenario, where the $I_{ext}$ at the measurement point close to the radio access port can be high, but it has only a minor impact on the $g_{HPA}$. Curve a can be exemplfied by a scenario when two operators antennas are located at the same tower (or close to each other). Curve b presents a traditional co-existence scenario, where even a relatively low $I_{ext}$ can have a considerable impact on the required $g_{HPA}$ depending on the location of the measurement point, radio access port, and the external interference source with respect to each other. Curve b can be exemplified by a scenario when the operators' antennas are not located close to each other. In the worst case, operator A has an antenna at the cell border of operator B. Curve c presents a scenario similar to b but now is the interfering source so strong that the base station can no longer transmit with the power required to maintain the coverage. The $I_{ext}$ has thus such a great impact on $g_{HPA}$, that the required system capacity and coverage can not be guaranteed at high $I_{ext}$ levels due to the maximum allowable $g_{HPA}$ limitation. Thus, in that kind of situation the only way to provide the required capacity is to decrease the coverage area, e.g. to add more radio access ports into the system. In general, one can state, that the minimum allowable $g_{HPA}$ is defined by the coverage and capacity requirement when $I_{ext}=0$. Furthermore, the maximum allowable $g_{HPA}$ level is set by for example the health regulations, hardware limitations, and power consumption.

Thus, the gain of HPA unit ($g_{HPA}$) and the gain of LNA unit ($g_{LNA}$) as a function of the estimated $I_{ext}$ look roughly like in FIG. 6 and in FIG. 8. It should be noted that the curves do not need to be linear, but only monotonically increasing. The actual shape of the curves is estimated adaptively based on the estimated $I_{ext}$, quality statistics and load level, so that at each point on the curve, the required capacity and coverage is secured.

Figure 9:
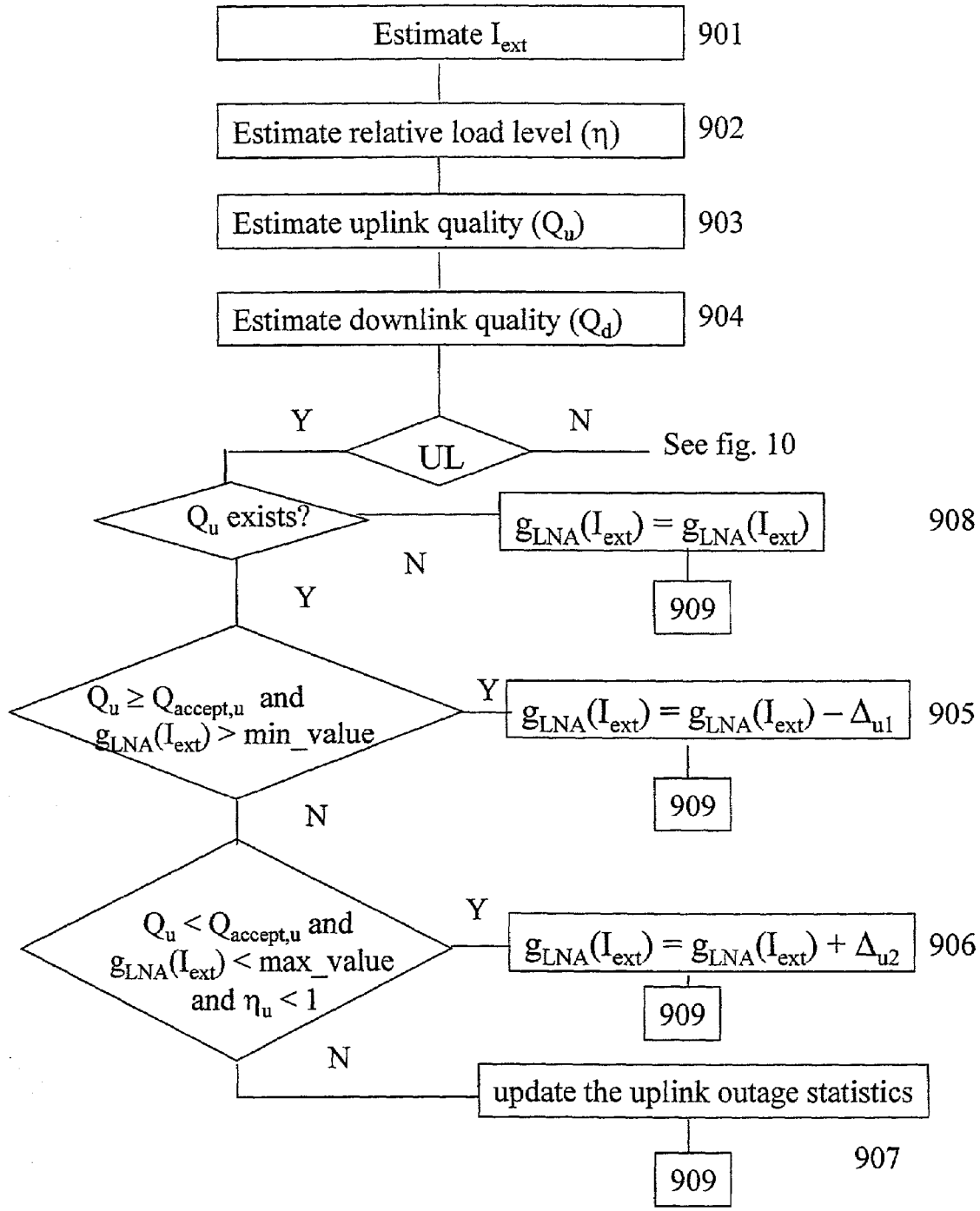
FIG. 9 shows a flowchart of the method in the uplink direction according to the present invention when $I_{tot}$ measurements are available.
Figure 10:
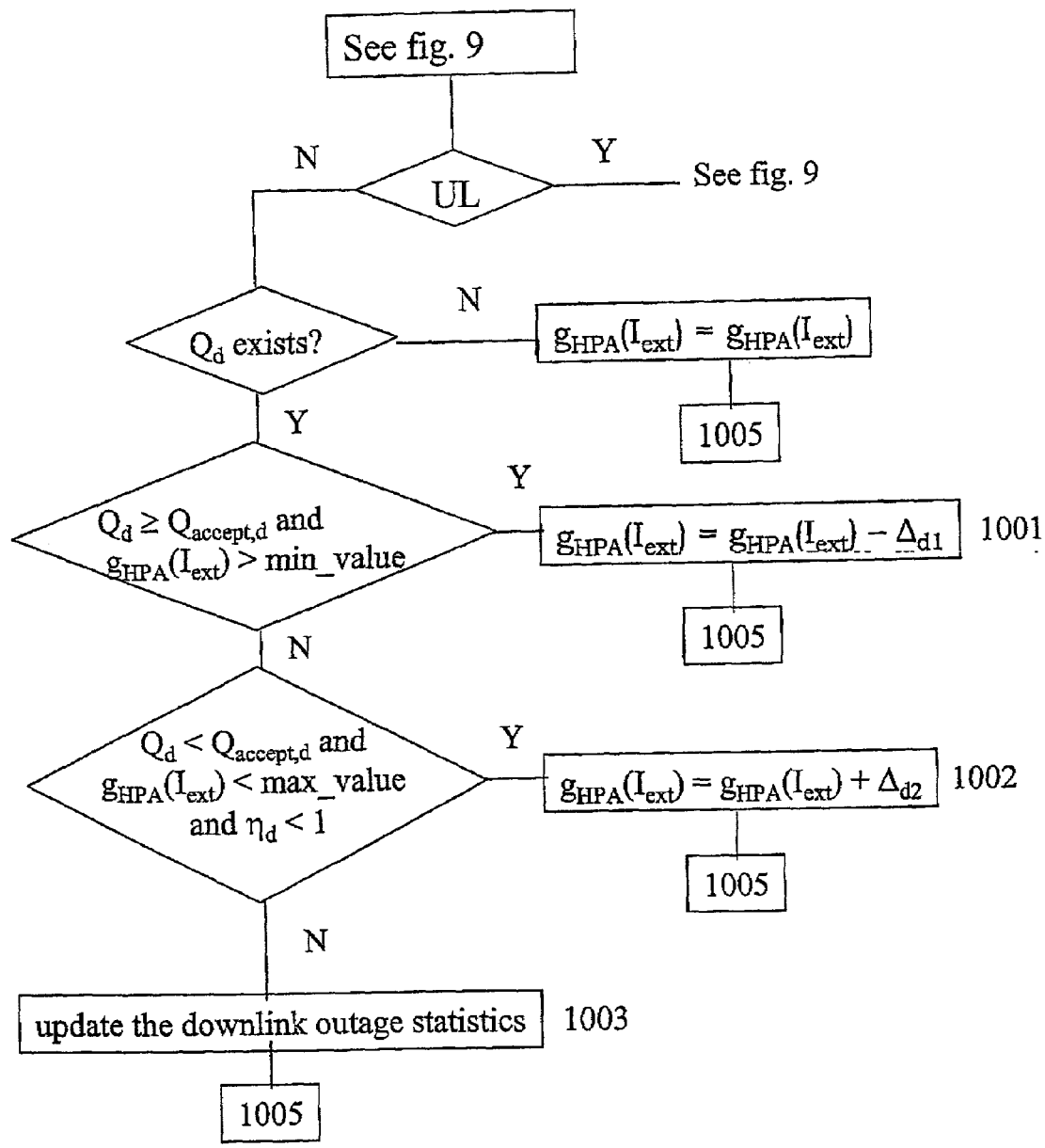
FIG. 10 shows a flowchart of the method in the downlink direction according to the present invention when $I_{tot}$ measurements are available.

An example of an adaptive algorithm for estimating the shapes of the $g_{LNA}(I_{ext})$ and $g_{HPA}(I_{ext})$ curves is described below and in FIG. 9, steps 901–908 and in FIG. 10, steps 1001–1004. After the estimation of the curve is performed the actual gain of the LNA and HPA, respectively, is set to a value according to the estimated curve (step 909 and step 1005).

901. Estimate $I_{ext}$.
902. Estimate the relative load levels for the uplink and the downlink ($\eta_u$ and $\eta_d$), $\eta_u=\eta_{meas,u}/\eta_{target,u}$, $\eta_d=\eta_{meas,d}/\eta_{target,d}$, where $\eta_{meas,u}$ and $\eta_{meas,d}$ are the measured load levels and $\eta_{target,u}$ together with $\eta_{target,d}$ are the predefined target values for the load levels. The load level is referred to as an interference related parameter.
903. Estimate uplink quality ($Q_u$).
904. Estimate downlink quality ($Q_d$).

For the Uplink:
905. If $Q_u \geq Q_{accept,u}$ and $g_{LNA}(I_{ext}) > $ min_value
then $g_{LNA}(I_{ext})=g_{LNA}(I_{ext})-\Delta_{u1}$
Where $Q_{accept,u}$ is an accepted value of the uplink quality, $g_{LNA}(I_{ext})$ is the gain of the LNA unit wherein the gain is dependent of the $I_{ext}$, min_value is a predefined minimum value of the gain and $\Delta_{u1}$ is a predefined step with which a current value of the $g_{LNA}(I_{ext})$ is reduced.
906. If $Q_u < Q_{accept,u}$ and $g_{LNA}(I_{ext}) < $ max_value and $\eta_u < 1$
then $g_{LNA}(I_{ext})=g_{LNA}(I_{ext})+\Delta_{u2}$
Where max_value is a predefined maximum value of the gain, $\eta_u$ is the relative load level for the uplink direction and $\Delta_{u2}$ is a predefined step with which a current value of the $g_{LNA}(I_{ext})$ is increased.
907. If $Q_u < Q_{accept,u}$ and $g_{LNA}(I_{ext})=$max_value and $\eta_u < 1$
then update the uplink outage statistics.
908. If $Q_u$ does not exist then $g_{LNA}(I_{ext})=g_{LNA}(I_{ext})$ I.e. if there is no quality input, the current shape of the $g_{LNA}(I_{ext})$ curve is kept.
909. Set $g_{LNA}=g_{LNA}(I_{ext})$, where $g_{LNA}$ is the actual gain value within the LNA.

For the Downlink:
1001. If $Q_d \geq Q_{accept,d}$ and $g_{HPA}(I_{ext}) > $ min_value
then $g_{HPA}(I_{ext})=g_{HPA}(I_{ext})-\Delta_{d1}$
Where $Q_{accept,d}$ is an accepted value of the downlink quality, $g_{HPA}(I_{ext})$ is the gain of the HPA unit wherein the gain is dependent of the $I_{ext}$, min_value is a predefined minimum value of the gain and $\Delta_{d1}$ is a predefined step with which a current value of the $g_{HPA}(I_{ext})$ is reduced.
1002. If $Q_d < Q_{accept,d}$ and $g_{HPA}(I_{ext}) < $ max_value and $\eta_d < 1$
then $g_{HPA}(I_{ext})=g_{HPA}(I_{ext})+\Delta_{d2}$
Where max_value is a predefined maximum value of the gain, $\eta_d$ is the relative load level for the downlink direction and $\Delta_d$ is a predefined step with which a current value of the $g_{HPA}(I_{ext})$ is increased.
1003. If $Q_d < Q_{accept,d}$ and $g_{HPA}(I_{ext})=$max_value and $\eta_d < 1$
then update the downlink outage statistics.
1004. If $Q_d$ does not exist then $g_{HPA}(I_{ext})=g_{HPA}(I_{ext})$ I.e. if there is no quality input, the current shape of the $g_{HPA}(I_{ext})$ curve is kept.
1005. Set $g_{HPA}=g_{HPA}(I_{ext})$, where $g_{HPA}$ is the actual gain value within the HPA.

The basic idea is that the gain in HPA unit and LNA unit is adjusted as a function of the estimated $I_{ext}$. A low level of $I_{ext}$ should result in low $g_{HPA}$ and $g_{LNA}$, and vice versa. Furthermore, the relationship between a certain level of $I_{ext}$ and an appropriate $g_{HPA}$ and $g_{LNA}$ is calibrated continuously, based on a number of different measures. One advantage with the algorithms defined by steps 901–909 and steps 1001–1005 when $I_{ext}$ is available over the algorithm defined by steps 1101–1106 and 1201–1203 when $I_{ext}$ is not available, is that the algorithm is less dependent on the load and quality measures; once the algorithm has run for some time (i.e. it has "learned"), it works relatively well, at least during a limited time period even without input concerning load and quality, which are only used to adjust the $g_{LNA}(I_{ext})$ and $g_{HPA}(I_{ext})$ curves. Thus, the performance of steps 908 and 1004 is possible.

The Total Interference ($I_{tot}$) Measurement is not Available

If the $I_{tot}$ measurement is not available, the gain in the HPA unit and LNA unit are adjusted based on the estimated uplink and downlink quality statistics, and load levels.

Figure 11:
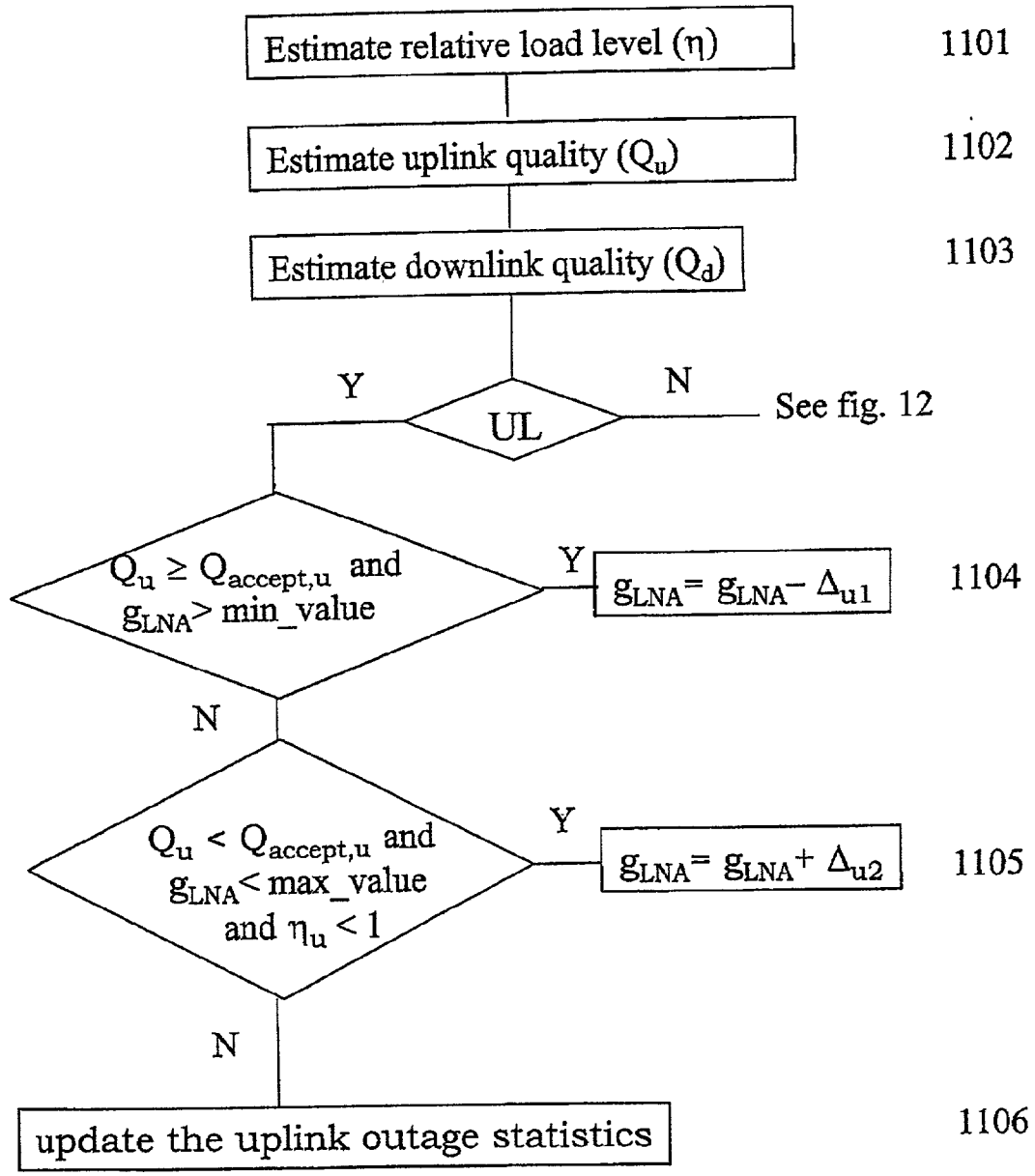
FIG. 11 shows a flowchart of the method in the uplink direction according to the present invention when $I_{tot}$ measurements not are available.
Figure 12:
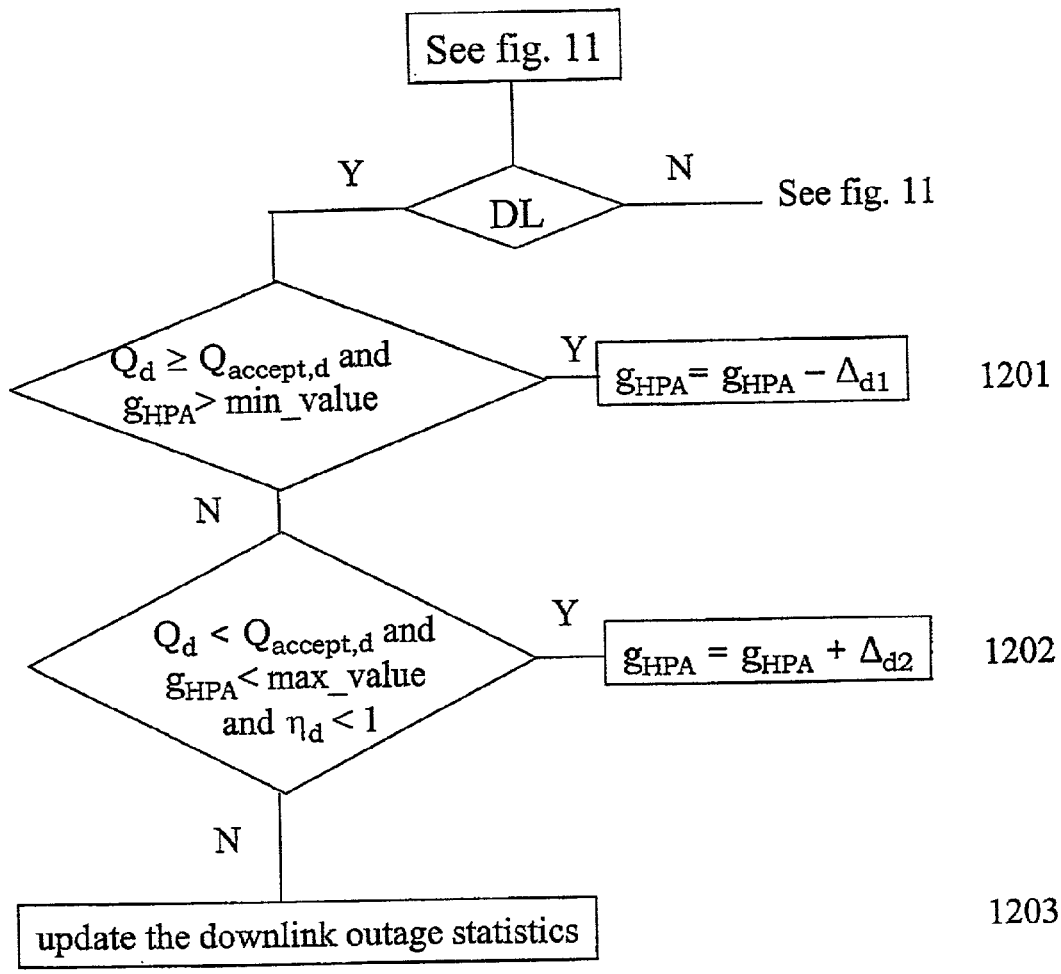
FIG. 12 shows a flowchart of the method in the downlink direction according to the present invention when $I_{tot}$ measurements not are available.

An example of an adjustment algorithm is described below in connection with FIG. 11 and FIG. 12. In this situation, the gain of the HPA unit an LNA unit are not dependent of $I_{ext}$ in contrast to when $I_{tot}$ measurements are available.

1101. Estimate the relative load levels ($\eta_u$ and $\eta_d$), $\eta u=\eta_{meas,u}/\eta_{target,u}$ $\eta_d=\eta_{meas,d}/\eta_{target,d}$ which are interference related parameters.
1102. Estimate uplink quality ($Q_u$).
1103. Estimate downlink quality ($Q_d$).

For the Uplink:
1104. If $Q_u \geq Q_{accept,u}$ (=minimum accepted uplink quality value) and $g_{LNA} > $ min_value (i.e. a predefined minimum allowed LNA gain)
then the updated gain of LNA ($g_{LNA}$) is set to $g_{LNA}-\Delta_{u1}$ ($\Delta_u$ is a predefined step with which a current value of the $g_{LNA}$ is reduced)
1105. If $Q_u < Q_{accept,u}$ and $g_{HPA} < $ max_value and $\eta_u < 1$
then $g_{LNA}=g_{LNA}+\Delta_{u2}$
1106. If $Q_u < Q_{accept,u}$ and $g_{LNA}=$max_value and $\eta_u < 1$
then update the uplink outage statistics.

For the Downlink:
1201. If $Q_d \geq Q_{accept,d}$ and $g_{HPA} > $ min_value
then $g_{HPA}=g_{HPA}-\Delta_{d1}$
1202. If $Q_d < Q_{accept,d}$ and $g_{HPA} < $ max_value and $\eta_d < 1$
then $g_{HPA}=g_{HPA}+\Delta_{d2}$
1203. If $Q_d < Q_{accept,d}$ and $g_{HPA}=$max_value and $\eta_d < 1$
then update the downlink outage statistics.

The basic idea is here to decrease the gain in HPA unit and LNA unit as long as the estimated uplink and downlink quality statistics are better than the minimum acceptable level, and as long as the gain values are larger than the minimum allowed level. If the estimated quality is found to be below the minimum acceptable level, the HPA gain and LNA gain is increased, but only if the estimated load level is below the target. Furthermore, the gain values are not increased above a certain maximum level.

In the two examples above, i.e. both when $I_{tot}$ is available and when $I_{tot}$ is not available, the $g_{HPA}$ and $g_{LNA}$ are updated independently in all cells.

However, from the RRM point of view, some kind of controlled updating might be favourable in order to maintain the cell border locations between the cells. When the presented algorithms not are able to increase the $g_{HPA}$ and $g_{LNA}$ further, the outage statistics is updated. This information can be used e.g. to inform the operator, that the system is experiencing coverage problems, and that additional radio access ports need to be installed.

In general, the up and down steps may have equal, or different values. However, it might be advantageous to take a larger step up, than down. Furthermore, the size of the step could depend on the estimated relative load levels, $\eta_u$ and $\eta_d$. E.g., the smaller $\eta_u$ or $\eta_d$, the smaller step down. At the same time, the smaller $\eta_u$ or $\eta_d$, the larger step up.

The methods, both when $I_{tot}$ is not available and when $I_{tot}$ is available, are implemented by means of a computer program product comprising the software code means for performing the steps of the method. The computer program product is run on processing means in an AGC unit or in any other logical control unit. The computer program is loaded directly or from a computer usable medium, such as a floppy disc, a CD, the Internet etc.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. Method for automatically minimizing impact of inter-cell interference and/or interference between co-existing Code Division Multiple Access (CDMA) telecommunication systems, wherein a transceiver unit is located within a radio base station in one CDMA system, said transceiver unit comprises a High Power Amplifier (HPA) unit configured to transmit radio signals to a mobile terminal and a Low Noise Amplifier (LNA) unit configured to receive radio signals from the mobile terminal, the method comprising:
   automatically controlling a maximum output level of the High Power Amplifier (HPA) unit based on current inter-cell interference and/or interference between co-existing systems by,
      performing estimations of interference related parameters, wherein performing estimations further includes estimating a relative downlink load level $\eta_d$, where the relative downlink load level $\eta_d$ is equal to a measured downlink load level ($\eta_{measured,d}$) divided with a predefined target downlink load level ($\eta_{target,d}$) (i.e. $\eta_{measured,d}/\eta_{target,d}$), and estimating a downlink quality $Q_d$ value, and
      controlling the output power levels of the output signals of the HPA unit by an Automatic Gain Control (AGC) unit connected to said HPA unit by using said estimations.

2. Method according to claim 1, wherein one AGC unit controls more than one HPA unit.

3. Method according to claim 1 wherein performing estimations further includes estimating an external interference $I_{ext}$.

4. Method according to claim 3, wherein controlling the output power levels further includes,
   setting the gain of the HPA unit ($g_{HPA}$) equal to the current value of the $g_{HPA}$ minus a predefined first Delta ($\Delta_{d1}$) if $Q_d$ is greater or equal to a predefined accepted quality value ($Q_{accept,d}$) and if $g_{HPA}$ is greater than a predefined minimum value of the gain,
   setting $g_{HPA}$ equal to the current value of $g_{HPA}$ plus a predefined second Delta ($\Delta_{d2}$) if $Q_d$ is smaller than the predefined accepted downlink quality value ($Q_{accept,d}$) and if $g_{HPA}$ is smaller than a predefined maximum value of the gain and if the relative downlink load level ($\eta_d$) is less than 1, or
   updating downlink outage statistics if $Q_d$ is smaller than the predefined accepted downlink quality value ($Q_{accept,d}$) and if $g_{HPA}$ is equal to the predefined maximum value of the gain and if the relative downlink load level ($\eta_d$) is less than 1,
   keeping the current gain of the HPA unit ($g_{HPA}$), is $Q_d$ does not exist, wherein the gain of the HPA unit ($g_{HPA}$) is a function that is dependent on the estimation of the external Interference ($I_{ext}$) and
   setting the actual gain of the HPA unit to the gain of the HPA unit that is dependent on the estimation of the external Interference ($I_{ext}$).

5. Method according to claim 1 wherein the controlling the output power levels further includes,
   setting the gain of the HPA unit ($g_{HPA}$) equal to the current value of the $g_{HPA}$ minus a predefined first Delta ($\Delta_{d1}$) if $Q_d$ is greater or equal to a predefined accepted quality value ($Q_{accept,d}$) and if $g_{HPA}$ is greater than a predefined minimum value of the gain,
   setting $g_{HPA}$ equal to the current value of $g_{HPA}$ plus a predefined second Delta ($\Delta_{d2}$) if $Q_d$ is smaller than the predefined accepted downlink quality value ($Q_{accept,d}$) and if $g_{HPA}$ is smaller than a predefined maximum value of the gain and if the relative downlink load level ($\eta_d$) is less than 1, or
   updating downlink outage statistics if $Q_d$ is smaller than the predefined accepted downlink quality value ($Q_{accept,d}$) and if $g_{HPA}$ is equal to the predefined maximum value of the gain and if the relative downlink load level ($\eta_d$) is less than 1.

6. Method according to claim 1, further comprising:
   automatically adjusting a maximum receiver sensitivity level of the LNA unit based on the current inter-cell interference and/or interference between co-existing systems by,
      performing estimations of interference related parameters,
      controlling the level of the receiver sensitivity of the LNA unit by an Automatic Gain Control (AGC) unit connected to said LNA unit by using said estimations.

7. Method according to claim 6, wherein one AGC unit controls more than one LNA unit.

8. Method according to claim 6, wherein adaptive gain in the LNA unit is obtained with an adaptive attenuator connected to a LNA with a fixed gain.

9. Method according to claim 1, wherein adaptive gain in the HPA unit is obtained with an adaptive attenuator connected to a HPA with a fixed gain.

10. Method according to claim 1, wherein the CDMA telecommunication system is a wideband CDMA telecommunication system.

11. A computer program product stored on a computer readable medium, comprising readable program for causing a processing means in an AGC unit to control the execution of the method in claim 1.

12. A computer program product directly loadable into a computer readable medium, comprising the software code portions for performing the method in claim 1.

13. Method for automatically minimizing impact of inter-cell interference and/or interference between co-existing Code Division Multiple Access (CDMA) telecommunication systems, wherein a transceiver unit is located within a radio base station in one CDMA system, said transceiver unit comprises a High Power Amplifier (HPA) unit configured to transmit radio signals to a mobile terminal and a Low Noise Amplifier (LNA) unit configured to receive radio signals from a mobile terminal, the method comprising:
automatically adjusting a maximum output power level of the High Power Amplifier (HPA) unit based on current inter-cell interference and/or interference between co-existing systems by,
performing estimations of interference related parameters, and
controlling the output power levels of the output signals of the HPA unit by an Automatic Gain Control (AGC) unit connected to said HPA unit by using said estimations; and
automatically adjusting a maximum receiver sensitivity level of the LNA unit based on the current inter-cell interference and/or interference between co-existing systems by,
performing estimations of interference related parameters, wherein performing estimations further includes, estimating a relative uplink load level $\eta_u$, where the relative uplink load level $\eta_u$ is equal to a measured uplink load level ($\eta_{measured,\ u}$) divided with a predefined target uplink load level ($\eta_{target,u}$) (i.e. $\eta_{measured,u}/\eta_{target,u}$), and estimating an uplink quality, $Q_u$, and
controlling the level of the receiver sensitivity of the LNA unit by an Automatic Gain Control (AGC) unit connected to said LNA unit by using said estimations.

14. Method according to claim 13, wherein performing estimations further comprises estimating an external interference $I_{ext}$.

15. Method according to claim 14, wherein controlling the level of the receiver sensitivity further includes,
setting the gain of the LNA unit ($g_{LNA}$) equal to the current value of the $g_{LNA\ UNIT}$ minus a predefined third Delta ($\Delta_{u1}$) if $Q_u$ is greater or equal to a predefined accepted quality value ($Q_{accept,u}$) and if $g_{LNA}$ is greater than a predefined minimum value of the gain,
setting $g_{LNA}$ equal to the current value of $g_{LNA}$ plus a predefined fourth Delta ($\Delta_{u2}$) if $Q_u$ is smaller than the predefined accepted uplink quality value ($Q_{accept,u}$) and if $g_{LNA}$ is smaller than a predefined maximum value of the gain and if the relative uplink load level ($\eta_u$) is less than 1, or
updating uplink outage statistics if $Q_u$ is smaller than the predefined accepted uplink quality value ($Q_{accept,u}$) and if $g_{LNA}$ is equal to the predefined maximum value of the gain and if the relative uplink load level ($\eta_u$) is less than 1,
keeping the current gain the LNA unit ($g_{LNA}$), if $Q_u$ does not exist, wherein the gain of the LNA unit ($g_{LNA}$) is a function that is dependent on the estimation of the external Interference ($I_{ext}$) and
setting the actual gain of the LNA unit to the gain of the LNA unit that is dependent on the estimation of the external Interference ($I_{ext}$).

16. Method according to claim 13, wherein controlling the level of the receiver sensitivity further includes,
setting the gain of the LNA unit equal to the current value of the $g_{LNA}$ minus a predefined Delta step ($\Delta_{u1}$) if $Q_u$ is greater or equal to a predefined accepted quality value ($Q_{accept,u}$) and if $g_{LNA}$ is greater than a predefined minimum value of the gain,
setting $g_{LNA}$ equal to the current value of $g_{LNA}$ plus a predefined fourth Delta ($\Delta_{u2}$) if $Q_u$ is smaller than the predefined accepted uplink quality value ($Q_{accept,u}$) and if $g_{LNA}$ is smaller than a predefined maximum value of the gain and if the relative uplink load level ($\eta_u$) is less than 1, or
updating uplink outage statistics if $Q_u$ is smaller than the predefined accepted uplink quality value ($Q_{accept,u}$) and if $g_{LNA}$ is equal to the predefined maximum value of the gain and if the relative uplink load level ($\eta_u$) is less than 1.

17. Automatic Gain Control (AGC) unit comprising:
means for automatically minimizing the impact of inter-cell interference and/or interference between co-existing Code Division Multiple Access (CDMA) telecommunication systems, wherein the AGC unit is located within a system node in a CDMA telecommunication system and the AGC unit is connected to a High Power Amplifier (HPA) unit configured to transmit radio signals to a mobile terminal and to a Low Noise Amplifier (LNA) unit configured to receive radio signals from the mobile terminal; and
means for automatically controlling the maximum output power levels of the output signals of the HPA unit, based on current inter-cell interference and/or interference between co-existing systems, by using a set of estimated interferences related parameters wherein said set of estimated interference related parameters comprises an estimation of a relative downlink load level $\eta_d$, where the relative downlink load level $\eta_d$ is equal to a measured downlink load level ($\eta_{measured,d}$) divided with a predefined target downlink load level ($\eta_{target,d}$) (i.e. $\eta_{measured,d}/\eta_{target,d}$), and an estimation of a downlink quality value ($Q_d$).

18. AGC unit according to claim 17, wherein said AGC unit controls more than one HPA unit.

19. AGC unit according to claim 17, wherein said set of estimated interference related parameters further comprises an estimation of an external interference ($I_{ext}$).

20. AGC unit according to claim 17, wherein said ACG unit comprises means for:
instructing the HPA unit to set the gain ($g_{HPA}$) equal to the current value of the $g_{HPA}$ minus a predefined first Delta ($\Delta_{d1}$) if the estimated downlink quality ($Q_d$) is greater or equal to a predefined accepted quality value ($Q_{accept,d}$) and if $g_{HPA}$ is greater than a predefined minimum value of the gain,
instructing the HPA unit to set $g_{HPA}$ equal to the current value of $g_{HPA}$ plus a predefined second Delta ($\Delta_{d2}$) if $Q_d$ is smaller than the predefined accepted downlink quality value ($Q_{accept,d}$) and if $g_{HPA}$ is smaller than a predefined maximum value of the gain and if a relative downlink load level ($\eta_d$) is less than 1, or updating downlink outage statistics if $Q_d$ is smaller than the predefined accepted downlink quality value ($Q_{accept,d}$) and if $g_{HPA}$ is equal to the predefined maximum value of the gain and if the relative downlink load level ($\eta_d$) is less than 1.

21. AGC unit according to claim 20, wherein said AGC unit comprises means for controlling more than one LNA unit.

22. AGC unit according to claim 20, wherein said AGC unit comprises means for:
instructing the LNA unit to set the gain ($g_{LNA}$) equal to the current value of the $g_{LNA}$ minus a predefined third Delta ($\Delta_{u1}$) if an estimated uplink quality value ($Q_u$) is greater or equal to a predefined accepted quality value ($Q_{accept,u}$) and if $g_{LNA}$ is greater than a predefined minimum value of the gain,
instructing the LNA unit to set $g_{LNA}$ equal to the current value of $g_{LNA}$ plus a predefined fourth Delta ($\Delta_{u2}$) if $Q_u$ is smaller than the predefined accepted uplink quality value ($Q_{accept,u}$) and if $g_{LNA}$ is smaller than a predefined maximum value of the gain and if the relative uplink load level ($\eta_u$) is less than 1, or
updating uplink outage statistics if $Q_u$ is smaller than the predefined accepted uplink quality value ($Q_{accept,u}$) and if $g_{LNA}$ is equal to the predefined maximum value of the gain and if the relative uplink load level ($\eta_u$) is less than 1, wherein the relative uplink load level $\eta_u$ is equal to a measured uplink load level ($\eta_{measured,u}$) divided with a predefined target uplink load level ($\eta_{target,u}$) (i.e. $\eta_{measured,u}/\eta_{target,u}$).

23. AGC unit according to claim 20, wherein said AGC unit further comprises means for:
instructing the LNA unit to set the gain ($g_{LNA}$) equal to the current value of the $g_{LNA}$ minus a predefined third Delta ($\Delta_{u1}$) if $Q_u$ is greater or equal to a predefined accepted quality value ($Q_{accept,u}$) and if $g_{LNA}$ is greater than a predefined minimum value of the gain,
instructing the LNA unit to set $g_{LNA}$ equal to the current value of $g_{LNA}$ plus a predefined fourth Delta ($\Delta_{u2}$) if $Q_u$ is smaller than the predefined accepted uplink quality value ($Q_{accept,u}$) and if $g_{LNA}$ is smaller than a predefined maximum value of the gain and if the relative uplink load level ($\eta_u$) is less than 1, or
updating uplink outage statistics if $Q_u$ is smaller than the predefined accepted uplink quality value ($Q_{accept,u}$) and if $g_{LNA}$ is equal to the predefined maximum value of the gain and if the relative uplink load level ($\eta_u$) is less than 1,
keeping the current gain of the LNA unit ($g_{LNA}$), if $Q_u$ does not exist, wherein the gain of the LNA unit ($g_{LNA}$) is a function that is dependent on the estimation of the external Interference ($I_{ext}$) and
setting the actual gain of the LNA unit to the gain of the LNA unit that is dependent on the estimation of the external Interference ($I_{ext}$).

24. AGC unit according to claim 17, wherein the AGC unit comprises means for automatically controlling the maximum receiver sensitivity levels of the input signals of the LNA unit, based on the current inter-cell interference and/or interference between co-existing systems, by using a set of estimated interference related parameters.

25. AGC unit according to claim 24, wherein adaptive gain in the LNA unit is obtained with an adaptive attenuator connected to a LNA with a fixed gain.

26. AGC unit according to claim 17, wherein adaptive gain in the HPA unit is obtained with an adaptive attenuator connected to a HPA with a fixed gain.

27. AGC unit according to claim 17, wherein the system node is a Radio Base Station.

28. AGC unit according to claim 17, wherein the system node is a Radio Network Controller.

29. AGC unit according to claim 17, wherein the CDMA telecommunications system is a wideband CDMA telecommunication system.

30. Automatic Gain Control (AGC) unit comprising:
means for automatically minimizing the impact of inter-cell interference and/or interference between co-existing Code Division Multiple Access (CDMA) telecommunication systems, wherein the AGC unit is located within a system node in a CDMA telecommunication system and the AGC unit is connected to a High Power Amplifier (HPA) unit configured to transmit radio signals to a mobile terminal and to a Low Noise Amplifier (LNA) unit configured to receive radio signals from a mobile the mobile terminal;
means for automatically controlling the maximum output power levels of the output signals of the HPA unit, based on current inter-cell interference and/or interference between co-existing systems, by using a set of estimated interferences related parameters;
means for instructing the HPA unit to set the gain ($g_{HPA}$) equal to the current value of the $g_{HPA}$ minus a predefined first Delta ($\Delta_{d1}$) if the estimated downlink quality ($Q_d$) is greater or equal to a predefined accepted quality value ($Q_{accept,d}$) and if $g_{HPA}$ is greater than a predefined minimum value of the gain;
means for instructing the HPA unit to set $g_{HPA}$ equal to the current value of $g_{HPA}$ plus a predefined second Delta ($\Delta_{d2}$) if $Q_d$ is smaller than the predefined accepted downlink quality value ($Q_{accept,d}$) and if $g_{HPA}$ is smaller than a predefined maximum value of the gain and if the relative downlink load level ($\eta_d$) is less than 1; or
means for updating downlink outage statistics if $Q_d$ is smaller than the predefined accepted downlink quality value ($Q_{accept,d}$) and if $g_{HPA}$ is equal to the predefined maximum value of the gain and if the relative downlink load level ($\eta_d$) is less than 1;
means for keeping the current gain of the HPA unit ($g_{HPA}$), if $Q_d$ does not exist, wherein the gain of the HPA unit ($g_{HPA}$) is a function that is dependent on the estimation of the external Interference ($I_{ext}$); and
means for setting the actual gain of the HPA unit to the gain of the HPA unit that is dependent on the estimation of the external Interference ($I_{ext}$) and wherein the gain of the HPA unit ($g_{HPA}$) is dependent on an estimation of the external Interference ($I_{ext}$).

31. Automatic Gain Control (AGC) unit comprising:
means for automatically minimizing the impact of inter-cell interference and/or interference between co-existing Code Division Multiple Access (CDMA) telecommunication systems, wherein the AGC unit is located within a system node in a CDMA telecommunication system and the AGC unit is connected to a High Power Amplifier (HPA) unit configured to transmit radio signals to a mobile terminal and to a Low Noise Amplifier (LNA) unit configured to receive radio signals from a mobile the mobile terminal; and
means for automatically controlling the maximum output power levels of the output signals of the HPA unit, based on current inter-cell interference and/or interference between co-existing systems, by using a set of estimated interferences related parameters;
wherein the AGC unit comprises means for automatically controlling the maximum receiver sensitivity levels of the input signals of the LNA unit, based on the current inter-cell interference and/or interference between co-existing systems, by using a set of estimated interference related parameters;

wherein said set of estimated interference related parameters comprises an estimation of a relative uplink load level $\eta_u$, where the relative uplink load level $\eta_u$ is equal to a measured uplink load level ($\eta_{measured,\ u}$) divided with a predefined target uplink load level ($\eta_{target,u}$) (i.e. $\eta_{measured,u}/\eta_{target,u}$), and an estimation of an uplink quality value ($Q_u$).

32. AGC unit according to claim 31, wherein said set of estimated interference related parameters further comprises an estimation of an external interference ($I_{ext}$).

* * * * *

UNITED STATES PATENT AND TRADEMARK OFFICE
CERTIFICATE OF CORRECTION

PATENT NO.        : 7,187,664 B2                                      Page 1 of 1
APPLICATION NO.   : 10/157221
DATED             : March 6, 2007
INVENTOR(S)       : Hiltunen It is certified that error appears in the above-identified patent and that said Letters Patent is hereby corrected as shown below:

On the title page (57)
<u>Abstract line 8:</u>

Please Correct "SPA" to read --HPA--

<u>Column 14,</u>

Line 11: Please add --third-- before "Delta"

Line 11: Please delete "step"

Signed and Sealed this

Twelfth Day of June, 2007

JON W. DUDAS
*Director of the United States Patent and Trademark Office*